Patented Nov. 12, 1935

2,020,338

UNITED STATES PATENT OFFICE 2,020,338

PROCESS OF TREATING DERIVATIVES OF CELLULOSE AND PRODUCT THEREOF

George W. Seymour, Cumberland, Md., assignor to Celanese Corporation of America, a corporation of Delaware No Drawing. Application April 12, 1932, Serial No. 604,876

2 Claims. (Cl. 106—40)

This invention relates to a solvent for cellulose acetate or other derivatives of cellulose and further relates to methods and compositions wherein such solvent is employed.

This application is in part a continuation of my prior application 574,928 filed November 13, 1931.

An object of my invention is to produce a new solvent for cellulose acetate and other derivatives of cellulose. Another object of my invention is to employ ethylene formal as a solvent for cellulose acetate or other derivatives of cellulose in various processes and for the preparation of various compositions. Other objects of my invention will appear from the following detailed description.

As is well known, the number of substances that are solvents for even the acetone soluble type of cellulose acetate having an acetyl value of 53 to 55% is very limited, and because of the small range of these solvents, it is often difficult or even impossible to find a solvent that meets with the requirements of a given problem, such as boiling point, compatibility or mutual solubility with other solvents, resins or other ingredients present in the cellulose acetate composition in which it is employed, cheapness, availability, etc.

This problem of finding a suitable volatile solvent for cellulose acetate of higher acetyl value, say 56 to 62.5% is particularly difficult. Whereas cellulose triacetate, that is, cellulose acetate having an acetyl value of 62.5% or other cellulose acetates of very high acetyl value have certain properties that for some purposes are superior to those of cellulose acetate of lower acetyl value and having optimum solubility in acetone, heretofore it has not been possible to form products therefrom commercially, since the very few known solvents for such high acetyl value cellulose acetate are either chlorinated hydrocarbons which hydrolize to form free acid that corrodes the metallic apparatus in which they are employed and some of which are toxic, or else are objectionable for other reasons. Moreover for most varieties of cellulose formate there are few if any volatile liquids known to have a true solvent action on the same.

I have found that ethylene formal is an excellent solvent for all varieties of cellulose acetate from the acetone soluble type to the fully acetylated cellulose triacetate, as well as for other derivatives of cellulose, particularly organic derivatives of cellulose and may be employed in all compositions and processes wherein cellulose acetate is to be dissolved. I have further found that ethylene formal is an excellent solvent for most varieties of cellulose formate.

The ethylene formal, also known as formal glycol or the methylene ether of ethylene glycol having the structural formula

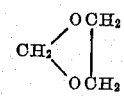

may be prepared by heating under reflux equimolecular proportions of ethylene glycol and formaldehyde in the presence of HCl, sulfuric acid, or other suitable catalysts. Its boiling point is 73 to 75° C. and it has a high solvent power for cellulose acetate and other organic derivatives of cellulose. Obviously the formal glycol or ethylene formal may be prepared in any other suitable manner.

The ethylene formal because of its boiling point of 73 to 75° C. may be used as a low boiling solvent in the preparation of solutions, plastic masses or other products or for other purposes wherein it is desired to dissolve partially or wholly derivatives of cellulose, particularly the organic derivatives of cellulose such as organic esters of cellulose and cellulose ethers. Examples of organic esters of cellulose being cellulose acetate, cellulose formate, cellulose butyrate, while examples of cellulose ethers are ethyl cellulose, methyl cellulose and benzyl cellulose. A few of the many instances of the use of ethylene formal will be given.

The ethylene formal may be employed alone or in conjunction with other low boiling, medium, or high boiling solvents, resins both natural and synthetic, plasticizers or other desired ingredients to prepare coating compositions or dopes containing cellulose acetate or other organic derivatives of cellulose, which coating compositions may be employed for coating fabrics, wood and the like, or as lacquers containing suitable natural or synthetic resins, to be applied to metallic or other smooth surfaces. Dopes containing the cellulose acetate dissolved in a solvent comprising ethylene formal may be cast on to smooth surfaces such as film bands, wheels and the like, to form upon evaporation of the solvent, films which may be used for photographic purposes, or thin foils to be employed as transparent wrappings for packages of foodstuffs, tobacco products and other articles of commerce. Such dopes may be extruded through orifices into an evaporative atmosphere, as in dry spinning, or into a precipitating bath as in wet spinning, to form filaments, yarns, bristles or straw.

Plastic compositions containing organic derivatives of cellulose, plasticizers and other desired ingredients may be made by the use of ethylene formal as at least part of the solvent during the kneading of the mass and subsequent working up of the same on heated malaxating rolls.

If desired besides the ethylene formal other solvents or liquids may be used in addition thereto, such as low boiling solvents or other liquids like acetone, ethylene dichloride and the like, and medium and/or high boiling solvents such as ethyl acetate, ethyl lactate, tetrachlorethane or diacetone alcohol. Examples of plasticizers for cellulose acetate are diphenylol propane, triacetin, dibutyl tartrate, diethyl phthalate, monomethylene xylene sulfonamid, triphenyl phosphate, etc.

Ethylene formal is an excellent solvent for the acetone soluble cellulose acetate having an acetyl value of 52 to 55% and is indeed in many respects superior to acetone itself as a solvent for such cellulose acetate, as is shown by the fact that solutions of the cellulose acetate in ethylene formal have higher clarity than corresponding solutions in acetone, and a greater quantity of diluent such as benzol or ethyl alcohol may be added to the solution of the cellulose acetate in ethyl formal before precipitation of the cellulose acetate takes place than in the case of a corresponding solution in acetone.

An important application of my invention is the use of ethylene formal as a volatile solvent in the preparations of solutions, plastics, liquid coating compositions, lacquers and the like containing cellulose acetate of high acetyl value, having an acetyl value of 56% up to and including the cellulose triacetate. As pointed out above there is no known commercially useful volatile solvent for cellulose triacetate or other highly acetylated cellulose acetates. Indeed, even in the case of cellulose acetates having an acetyl value of 56% to 58%, which are acetone-soluble, the production of filaments of fine denier is more difficult than in the case when normal commercial cellulose acetates having an acetyl value of about 52% to 54% are employed. Not only is this difficulty found when acetone solutions of the cellulose acetate are employed, but it is also present in the case of the use of other solvents or solvent mixtures, such as methylene chloride and mixtures of methylene or ethylene chloride and ethyl or methyl alcohol.

I have found that by the use of ethylene formal as a solvent, it is possible to form solutions of cellulose acetate of acetyl value above 56% which solutions have high clarity and which may be spun by a dry spinning process to form fine filaments or denier as low as 2 up to 5, 6, 7 or more,—a result heretofore impossible of attainment.

Moreover, solutions of such high acetyl value cellulose acetate, say cellulose triacetate, in ethylene formal may be cast to form films or foils which are superior to films or foils made from the ordinary acetone soluble cellulose acetate in many respects, such as greater impermeability to moisture, greater resistance to cockling, crinkling and delustering when subjected to boiling water or boiling soap solutions or other hot aqueous media, greater tensile strength, greater resistance to the solvent action of various organic liquids and higher melting point. Yarns made of cellulose acetate of higher acetyl value have similar superior properties as compared to yarn made of the ordinary acetone soluble cellulose acetate.

Plasticizers such as dibutyl tartrate, dimethyl phthalate, diethyl phthalate and triacetin that are compatible with ordinary acetone soluble cellulose acetate are compatible with the cellulose acetate of higher acetyl value and may be used in conjunction therewith for forming coating compositions, plastics, films, filaments, etc.

In order further to illustrate my invention, but without being limited thereto, the following specific examples are given.

*Example I*

1 part of cellulose acetate having an acetyl value of about 58% is dissolved in 3 parts by weight of ethylene formal. The solution or dope thus formed is extruded through a spinning jet having holes of 0.07 mm. in diameter into a cabinet through which air or other evaporative atmosphere of a temperature of about 70° C. is caused to pass. The filaments so formed are drawn off and may be twisted together and wound on a cap spinning device to form yarn having the desirable characteristics above described. In this manner filaments having a denier of 2 to 7 may be formed.

*Example II*

Cellulose triacetate having an acetyl value of 62.5% is employed for making films or foils. A solution is formed having the following composition.

| | Parts by weight |
|---|---|
| Cellulose triacetate | 100 |
| Plasticizer | 30 |
| Ethylene formal | 500 |

The plasticizer may be dibutyl tartrate, dimethyl phthalate, diethyl phthalate or triacetin or a mixture of two or more of these.

The solution so formed is cast upon a smooth polished surface such as upon a film wheel and the solvent caused to evaporate, the film or foil so produced then being dried. Films or foils made in this manner have the desirable properties above described.

In this specification the figures of acetyl value of the cellulose acetate are calculated as acetic acid.

It is to be understood that the foregoing detailed description is given merely by way of illustration and that many variations may be made therein without departing from the spirit of my invention.

Having described my invention, what I claim and desire to secure by Letters Patent is:

1. A composition of matter comprising cellulose acetate having an acetyl value above 56% dissolved in a volatile solvent consisting of ethylene formal.

2. A composition of matter comprising cellulose acetate having an acetyl value above 58% dissolved in a volatile solvent consisting of ethylene formal.

GEORGE W. SEYMOUR.